July 12, 1927.

J. ROGGINGER 1,635,346

MILK BOTTLE SUPPORTING AND LOCKING DEVICE

Filed July 6, 1925

2 Sheets-Sheet 1

Inventor
JOHN ROGGINGER

By A. B. Bowman
Attorney

July 12, 1927.
J. ROGGINGER
1,635,346
MILK BOTTLE SUPPORTING AND LOCKING DEVICE
Filed July 6, 1925
2 Sheets-Sheet 2
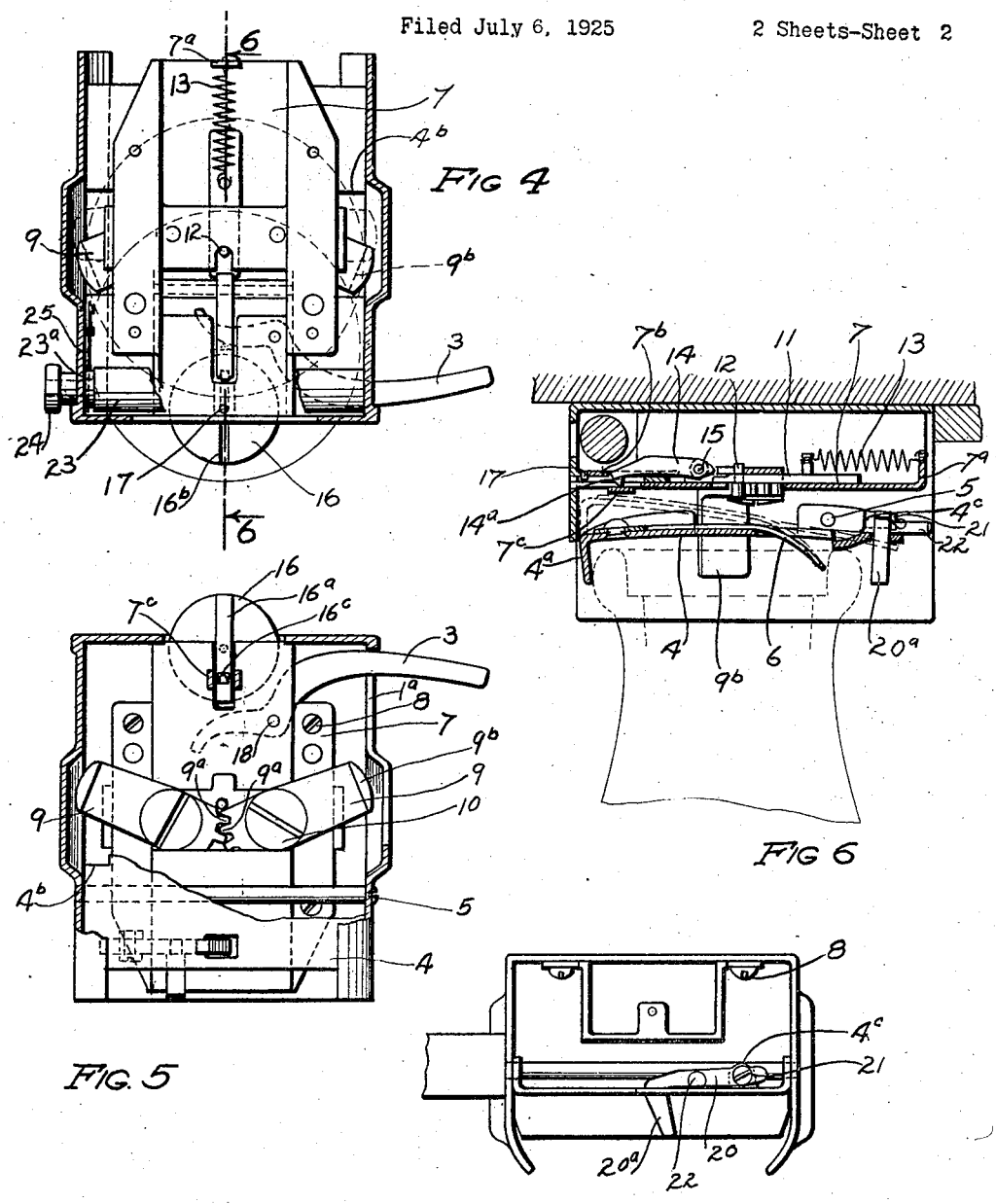
Inventor
JOHN ROGGINGER
By A. B. Bowman
Attorney Patented July 12, 1927.

1,635,346

UNITED STATES PATENT OFFICE.

JOHN ROGGINGER, OF SAN DIEGO, CALIFORNIA, ASSIGNOR TO NORCO MFG. CO., OF NORCO, CALIFORNIA, A CORPORATION OF CALIFORNIA.

MILK-BOTTLE SUPPORTING AND LOCKING DEVICE.

Application filed July 6, 1925. Serial No. 41,618.

My invention relates to a milk bottle supporting and locking device, and the objects of my invention are: first, to provide a device of this class in which a full milk bottle may be placed and locked therein so that the same cannot be removed from the outside of the house or room on or at which the device is secured; second, to provide a device of this class in which a coin may be inserted as payment for a bottle of milk or cream, which coin cannot be removed until a bottle is placed and locked in the device; third, to provide a device of this class having means for supporting an empty milk bottle, which bottle is locked in place by inserting a coin in the device, and which coin and empty milk bottle can be removed only by placing and locking another milk bottle in the main portion of the device; fourth, to provide a device of this class for supporting and locking an empty milk bottle so that the same cannot be removed and placed in the coin release portion of the device for releasing the coin until a second bottle is placed and locked in the coin releasing portion of the device; fifth, to provide as a whole a novelly constructed milk bottle supporting and locking device, and sixth, to provide a device of this class which is simple and economical of construction proportionate to its functions, durable, efficient, compact, and which will not readily deteriorate or get out of order.

Figure 1:
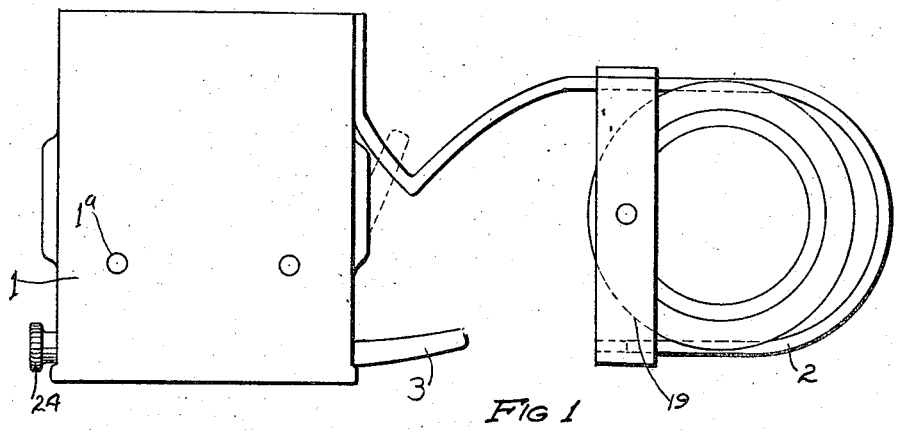
Figure 2:
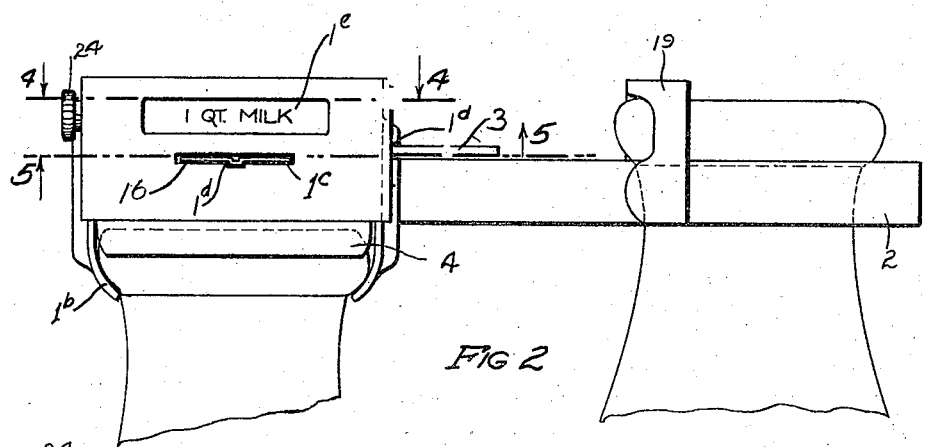
Figure 3:
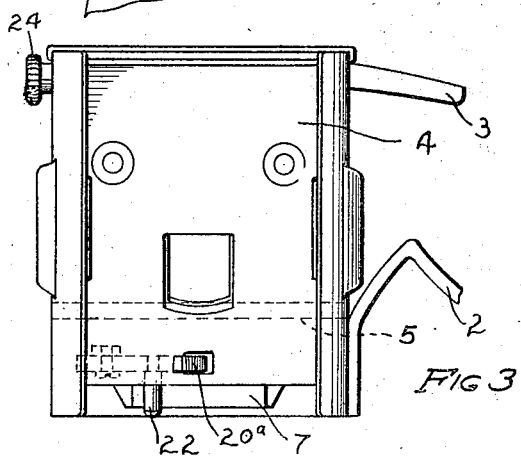

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a plan view of my device; Fig. 2 is a front elevational view thereof, showing fragmentary portions of milk bottles supported therein; Fig. 3 is a fragmentary bottom view thereof; Fig. 4 is a sectional view thereof in plan, taken through 4—4 of Fig. 2, showing other parts and portions thereof broken away and in section to facilitate the illustration; Fig. 5 is a partial bottom and partial sectional view thereof, taken through 5—5 of Fig. 2; Fig. 6 is a longitudinal sectional elevational view thereof, taken through 6—6 of Fig. 4, showing certain parts and portions in elevation to facilitate the illustration, and showing by dotted lines a fragmentary portion of a milk bottle supported therein; and Fig. 7 is a fragmentary rear elevational view thereof.

Like characters of reference refer to similar parts and portions throughout the several views of the drawings.

My device consists essentially of a frame or casing 1 in which is mounted a bottle retaining means and a coin retaining and release means, a bottle supporting frame 2 supported at one side of the frame or casing 1, and a latch member 3 for preventing the removal of a bottle placed in the frame 2 and released by the coin retaining and release means of the frame or casing 1.

The casing 1 is adapted to be secured by means of screws through holes 1ª in the upper wall of the casing 1 to the under side of the upper or cross member of a door or window casing of a house or room, to keep the milk bottle from the floor.

The lower portion of the front side or end and the rear side or end and the bottom of the casing 1 are open, as shown. The lower portions of the sides of the casing are bent inwardly, as indicated by 1ᵇ in Figs. 2 and 7, forming ledges for supporting milk bottles at their upper ends, as shown in Fig. 2. At the lower portion of the casing 1 is positioned a milk bottle retaining member 4 in the form of a plate, which is pivotally supported near its rear end, by means of a pin or screw 5, on the side walls of the casing 1. The front end of the plate 4 is bent downwardly, as indicated by 4ª in Fig. 6, which permits the plate 4 to be tilted upwardly for the insertion of the milk bottle and also provides a retaining means for the removal of the milk bottle. On the inner side of the plate 4 is secured a resilient bottle retaining member 6 which is bent outwardly and extends through an opening in the plate 4, as shown in Fig. 6, the end of which resilient retaining member is adapted to be engaged by the inner portion of the milk bottle when the same is shifted to such position to prevent the removal of the milk bottle therefrom.

Within the casing 1 is positioned a channel-shaped supporting member 7, which is secured to the under side of the top wall of the casing 1 by means of screws 8. Intermediate the ends of and at the under side of the member 7 are pivotally mounted, by means of screws 10, two coacting L-shaped levers 9. These levers are provided at their adjacent ends with gear portions $9^a$, which mesh with each other, providing uniform coaction between said levers. Said levers are provided at their outer ends with downwardly extending portions $9^b$, which extend downwardly through openings $4^b$ at the sides of the bottle retaining plate 4, as shown best in Figs. 4 and 5. These downwardly extending portions $9^b$ are adapted to be engaged by the upper portions or flanges of the milk bottle as the same are placed in the device, the shifted positions of the levers 9 being shown by dotted lines in Fig. 4. At the inner side of the supporting member 7 is reciprocally mounted a slide 11 which is held in a backward position by means of a tension spring 13 secured at its rear end to an upwardly extending lug $7^a$ at the rear end of the member 7. The backward shifting of the slide 11 is limited by means of a stop 12 extending through the slide and adapted to engage a stop portion on the member 7, as shown best in Fig. 4. Said stop 12 extends through the slide 11 and is adapted to be engaged at its opposite end by the inner end of one of the levers 9, as shown in Fig. 5. At the upper side of the channel-shaped supporting member 7 is pivotally mounted at its one end, by means of a pin 15, the coin retaining and release lever 14 which is provided at the under side of its free end with a hook portion $14^a$ adapted to extend through a corresponding hole in the coin 16 adapted to be inserted into the casing through a slot $1^c$ in the front wall of the casing 1, as shown in Figs. 2, 5 and 6. The front end of the member 7 is also provided with a horizontally slotted portion $7^b$ which registers with the slot $1^c$ of the casing 1 and is adapted to receive the coin positioned through said slot $1^c$.

It will be here noted that the coin shown in the drawings is especially constructed, as shown in Fig. 2, being provided with a longitudinal ridge $16^a$ at its under side, a slot $16^b$ at its upper side, and a hole $16^c$ near the one end of the offset portion formed by said ridge and said slot, as shown in Fig. 5.

The slot $1^c$ at the front end of the casing 1 is correspondingly provided with a downwardly offset portion $1^d$ to receive the ridge $16^a$ of the coin. In the forward end of the member 7 is provided a pin 17 which extends into the slot $7^b$ at the front end of the member 7 and is adapted to extend into the slot of the coin. The lower portion of the member 7 at the front end thereof, into which the ridge of the coin is adapted to extend, is cut away, as shown in Figs. 5 and 6, but is connected by a cross portion $7^c$ upon which the hook portion $14^a$ of the coin retaining and release lever 14 is adapted to rest. The rear end of the lever 14 is cam-shaped and is adapted to be engaged by the forward end of the slide 11 for rotating the lever 14 about its pivotal axis, rotating the forward end thereof and releasing the hook portion thereof from the hole in the coin.

In the slotted portion $7^b$ of the member 7 is pivotally mounted, by means of a pin 18, the lever 3, which extends outwardly through a longitudinal slot $1^d$ in the side wall of the casing 1. This lever is prevented from being shifted backwardly to the dotted line position shown in Fig. 1 by reason of its opposite end being adapted to engage the coin 16 or the downwardly extending hook portion $14^a$ of the lever 14. The portion of the lever 3 extending beyond the casing 1 serves as a latch to prevent the removal of a bottle placed in the U-shaped supporting frame 2 and secured to the one side of the casing 1. The supporting frame 2 is made of a metal strap, bent substantially as shown in Fig. 1 and reinforced by means of a U-shaped strap 19 secured at its front end to the free end of the strap 2 and at its opposite end to the back portion of the frame 2. This U-shaped strap 19 is also preferably secured to the door or window casing.

At the rear end of the bottle retaining member or plate 4 is provided an upwardly extending lug $4^c$ on which is pivotally mounted, by means of a screw 21, a hook-shaped lever 20, the hook portion $20^a$ thereof extending downwardly through a hole at the rear end of said plate. This hook portion $20^a$ is adapted to prevent the shifting of the milk bottle beyond the same, thus preventing the downwardly extending portions $9^b$ of the levers 9 from being released by the annular flange at the upper end of the milk bottle, and thus relock the coin and the latch lever 3. Said hook lever 20 is provided with a handle portion 22, which is adapted to be raised from within when the door or window upon the casing of which the device is mounted, is opened for permitting the withdrawal of the milk bottle.

At the front upper corner of the casing 1 is rotatably mounted a drum 23 upon which are inscribed various designations, as shown in Fig. 2, for informing the vender of the kind and quantity of goods desired. In the front wall of the casing 1 is provided another opening 1ᵉ through which the designations on the drum 23 may be seen. This drum is provided at its one end with a knob 24, which is positioned outside of the casing for rotating the drum. The one end of the drum 23, within the casing 1, is provided with a plurality of flat portions 23ᵃ, which are adapted to be engaged by a spring 25 secured to the side wall of the casing 1 for holding the drum in certain shifted positions.

When desiring to order a certain kind and amount of milk or cream, the knob 24 is rotated to the desired position and the empty bottle placed in the supporting frame 2. The coin 16 is then inserted, as shown in Figs. 4 and 5, which coin is locked in position by the lever 14 and also locks the latch lever 3 to prevent the removal of the empty bottle in the frame 2. When a full bottle is then placed in the device by raising the downwardly extending portion 4ᵃ of the retaining member 4 and shifting the same backwardly, the milk bottle is locked by the resilient retaining member 6. The inward shifting of the bottle also shifts the lever 9, which shifts the slide 11 and raises the lever 14, permitting the coin to be withdrawn and the lever 3 to be shifted from the solid to the dotted line position, shown in Fig. 1, permitting the empty milk bottle, supported in the frame 2, to be withdrawn.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a milk bottle supporting and locking device, a frame provided at its lower portion with bottle supporting means and in one of its sides with a coin receiving means, a bottle retaining member shiftably mounted in said frame and provided with means to prevent the withdrawal of said bottle from the one end of said frame, and lever means mounted in said frame engageable and shiftable by the upper end of said bottle for releasing a coin positioned in said coin receiving means.

2. In a milk bottle supporting and locking device, a frame provided at its lower portion with bottle supporting means and in one of its sides with a coin receiving means, a bottle retaining member shiftably mounted in said frame and provided with means to prevent the withdrawal of said bottle from the one end of said frame, lever means mounted in said frame engageable and shiftable by the upper end of said bottle for releasing a coin positioned in said coin receiving means, another milk bottle supporting frame positioned at one side of said first mentioned frame, and release means in said first mentioned frame actuated by said lever means for permitting the removal of a bottle supported in said other milk bottle supporting frame.

3. In a device of the class described, a frame provided with means for supporting a milk bottle, another frame in connection therewith for supporting another milk bottle, means in connection with said first mentioned frame for releasing a bottle supported in said last mentioned frame when inserting a bottle in the former, a coin receiving and retaining mechanism mounted in said first mentioned frame, and means in connection with said mechanism and said first mentioned means for releasing a coin retained by said mechanism when placing a bottle in said first mentioned frame.

4. In a device of the class described, a milk bottle supporting means, a means in connection therewith for retaining a milk bottle therein, and a coin receiving and retaining mechanism in connection with said supporting means for releasing a coin when placing a bottle in said supporting means.

5. In a device of the class described, a milk bottle supporting means, a means in connection therewith for retaining a milk bottle therein, a coin receiving and retaining mechanism in connection with said supporting means for releasing a coin when placing a bottle in said supporting means, a frame in connection with said supporting means for supporting another milk bottle, and latch means in connection with said coin receiving and retaining mechanism for permitting the release of the bottle held by said frame.

6. In a milk bottle supporting and locking device, a frame open at its lower end and provided at said lower end with bottle supporting ledges and at its one side with a coin receiving slot, a bottle retaining member pivotally mounted in said frame and provided with means to prevent the withdrawal of said bottle from the one end thereof and of said frame, and lever means pivotally mounted in said frame engageable and shiftable by the upper end of said bottle for releasing a coin positioned in the coin receiving slot of said frame.

7. In a milk bottle supporting and locking device, a frame open at its lower end and provided at said lower end with bottle supporting ledges and at its one side with a coin receiving slot, a bottle retaining member pivotally mounted in said frame and provided with means to prevent the withdrawal of said bottle from the one end thereof and of said frame, lever means pivotally mounted in said frame engageable and shiftable by the upper end of said bottle for releasing a coin positioned in the coin receiving slot of said frame, another milk bottle supporting frame positioned at one side of said first mentioned frame, and release means in said first mentioned frame actuated by said lever means for permitting the removal of the bottle supported in said other milk bottle supporting frame.

8. In a device of the class described, a frame open at its lower end and provided at said end with bottle supporting means and at its front side with a coin receiving slot, a bottle retaining member pivotally mounted in the lower open portion of said frame, a coin retaining member shiftably mounted in said frame and extensible into said coin receiving slot, and means extending into the lower open portion of said frame adapted to be engaged by a bottle placed therein and connected with said coin retaining member for shifting the same and releasing the coin placed in said slot.

9. In a device of the class described, a frame open at its lower end and provided at said end with bottle supporting means and at its front side with a coin receiving slot, a bottle retaining member pivotally mounted in the lower open portion of said frame, a coin retaining member shiftably mounted in said frame and extensible into said coin receiving slot, means extending into the lower open portion of said frame adapted to be engaged by a bottle placed therein and connected with said coin retaining member for shifting the same and releasing the coin placed in said slot, and a lever means pivotally mounted in said frame operable from the outside thereof and adapted to engage at its inner end a coin positioned in said slot.

10. In a device of the class described, a frame open at its lower end and provided at said end with bottle supporting means and at its front side with a coin receiving slot, a bottle retaining member pivotally mounted in the lower open portion of said frame, a coin retaining member shiftably mounted in said frame and extensible into said coin receiving slot, means extending into the lower open portion of said frame adapted to be engaged by a bottle placed therein and connected with said coin retaining member for shifting the same and releasing the coin placed in said slot, and another frame positioned at one side of said first mentioned frame for supporting another bottle, and lever means pivotally mounted in said first mentioned frame and extensible across the opening of said last mentioned frame for preventing the removal of a bottle placed therein.

11. In a device of the class described, a casing open at its lower end and at the lower portions of its front and rear ends and provided at its front end with a coin receiving slot, a bottle retaining member pivotally mounted near its rear end at the lower portion of and within said casing and provided at its front end with a bottle retaining portion, a bottle retaining spring member extending downwardly from said pivotally mounted bottle retaining member, a pair of levers pivotally mounted in said casing and extending downwardly therein below said bottle retaining member, a slide reciprocally mounted in said casing adapted to be shifted by said levers, and a coin retaining lever pivotally mounted in said casing and adapted to extend with its one end into said coin receiving slot and also adapted to be engaged and shifted by said slide.

12. In a device of the class described, a casing open at its lower end and at the lower portions of its front and rear ends and provided at its front end with a coin receiving slot, a bottle retaining member pivotally mounted near its rear end at the lower portion of and within said casing and provided at its front end with a bottle retaining portion, a bottle retaining spring member extending downwardly from said pivotally mounted bottle retaining member, a pair of levers pivotally mounted in said casing and extending downwardly therein below said bottle retaining member, a slide reciprocally mounted in said casing adapted to be shifted by said levers, a coin retaining lever pivotally mounted in said casing and adapted to extend with its one end into said coin receiving slot and also adapted to be engaged and shifted by said slide, and a manually shiftable stop member pivotally mounted on said bottle retaining member and operable from the rear end of said casing.

13. In a device of the class described, a casing open at its lower end and at the lower portions of its front and rear ends and provided at its front end with a coin receiving slot, a bottle retaining member pivotally mounted near its rear end at the lower portion of and within said casing and provided at its front end with a bottle retaining portion, a bottle retaining spring member extending downwardly from said pivotally mounted bottle retaining member, a pair of levers pivotally mounted in said casing and extending downwardly therein below said bottle retaining member, a slide reciprocally mounted in said casing adapted to be shifted by said levers, a coin retaining lever pivotally mounted in said casing and adapted to extend with its one end into said coin receiving slot and also adapted to be engaged and shifted by said slide, a bottle supporting frame mounted at the one side of said casing for supporting another milk bottle, and a lever pivotally mounted within said casing and extending with its outer end beyond said casing into the space through which a bottle is adapted to be inserted for supporting the same on said frame, said lever being adapted to be released by said coin retaining lever.

In testimony whereof, I have hereunto set my hand at San Diego, California, this 22nd day of June, 1925.

JOHN ROGGINGER.